United States Patent
Boes

(10) Patent No.: US 12,543,706 B2
(45) Date of Patent: Feb. 10, 2026

(54) CAMERA DEVICE FOR MONITORING AND RECOGNISING ANIMALS OR PORTIONS THEREOF, AND ASSOCIATED LIVESTOCK SHED

(71) Applicant: LELY PATENT N.V., Maassluis (NL)

(72) Inventor: Piet Boes, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 309 days.

(21) Appl. No.: 18/558,475

(22) PCT Filed: May 17, 2022

(86) PCT No.: PCT/IB2022/054569
§ 371 (c)(1),
(2) Date: Nov. 1, 2023

(87) PCT Pub. No.: WO2022/243863
PCT Pub. Date: Nov. 24, 2022

(65) Prior Publication Data
US 2024/0237618 A1 Jul. 18, 2024

(30) Foreign Application Priority Data
May 18, 2021 (NL) .................................. 2028234

(51) Int. Cl.
*A01K 29/00* (2006.01)
*G06V 20/52* (2022.01)
(Continued)

(52) U.S. Cl.
CPC ............ *A01K 29/005* (2013.01); *H04N 7/18* (2013.01); *H04N 23/51* (2023.01); *H04N 23/52* (2023.01);
(Continued)

(58) Field of Classification Search
CPC ...... A01K 29/005; H04N 23/51; H04N 23/52; H04N 23/56; H04N 7/18; G06V 20/52; G60V 40/10
See application file for complete search history.

(56) References Cited

U.S. PATENT DOCUMENTS

| | | | |
|---|---|---|---|
| 2015/0379324 A1 | 12/2015 | Hofman et al. | |
| 2019/0138801 A1 | 5/2019 | Psota et al. | |
| 2021/0315186 A1* | 10/2021 | Azimi-Sadjadi | ........ G10L 25/51 |

OTHER PUBLICATIONS

Neatmo Welcome camera, described at https://homekitnews.com/2018/12/17/netatmo-welcome-camera-review/, Dec. 17, 2018 (Year: 2018).*

(Continued)

*Primary Examiner* — Ming Shui
(74) *Attorney, Agent, or Firm* — Oblon, McClelland, Maier & Neustadt, L.L.P.

(57) ABSTRACT

A camera device for observing and recognizing a livestock animal in a shed environment. The camera includes a housing with an outer surface and with a light transmitting opening, an optics for forming an image of the environment, a light-sensitive sensor provided in the housing for recording the formed image, an image processing device for processing the recorded image and recognizing a portion of a shed animal, and a control unit. A first portion of the outer surface is lighter in colour on a side of the opening at least directly around than opening than a second portion of the outer surface which is located away from the opening and which is at least half the size of the first portion. The lighter colour around the one or more openings reduces soiling by flies in comparison with known cameras with black surroundings for these openings.

20 Claims, 2 Drawing Sheets

Figure 1:
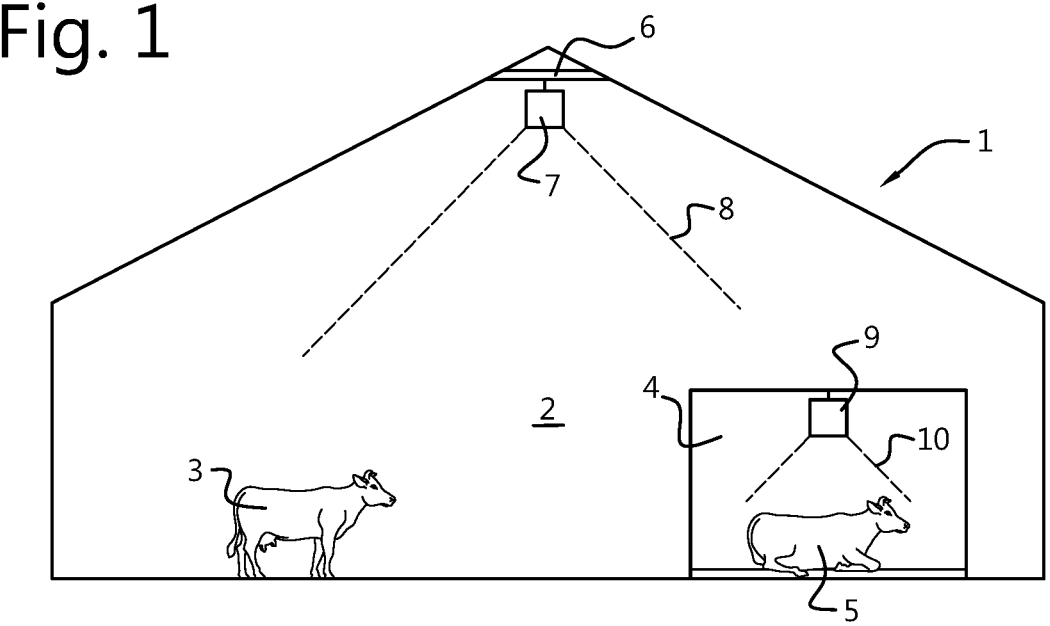

(51) Int. Cl.
  *G06V 40/10* (2022.01)
  *H04N 7/18* (2006.01)
  *H04N 23/51* (2023.01)
  *H04N 23/52* (2023.01)
  *H04N 23/56* (2023.01)

(52) U.S. Cl.
  CPC ............ *H04N 23/56* (2023.01); *G06V 20/52* (2022.01); *G06V 40/10* (2022.01)

(56) References Cited

OTHER PUBLICATIONS https://www.ourglobetrotters.com/best-kids-underwater-cameras/ , Mar. 24, 2021 (Year: 2021).*
International Search Report mailed on Sep. 6, 2022 in PCT/IB2022/054569 filed on May 17, 2022.

* cited by examiner

CAMERA DEVICE FOR MONITORING AND RECOGNISING ANIMALS OR PORTIONS THEREOF, AND ASSOCIATED LIVESTOCK SHED

This application is a 371 application of PCT/IB2022/054569 filed May 17, 2022 and claims benefit of NL 2028234, filed May 18, 2021. The contents of each of these applications are incorporated herein by reference.

The present invention relates to a camera device for observing and recognising at least a portion of a livestock animal in a shed environment, comprising a housing with an outer surface and with a light transmitting opening, an optics, provided in the housing behind said opening, for forming an image of a portion of the camera's environment, a light-sensitive sensor with a matrix of pixels provided in the housing, which is configured to record said formed image, an image processing device for processing said recorded image and for recognising at least a portion of said shed animal therein, and a control unit for controlling the camera device.

Such camera devices are known per se, and are used, for example, for monitoring pregnant animals, heat recognition and so on. To recognise portions of animals, the images have to be sufficiently clear and free from interference. In a shed environment, in particular for ruminants such as cattle, there are many insects present, especially flies. These flies often exhibit a strong tendency to land on objects such as cameras, and to leave their droppings thereon. Such droppings result in interference in the observed image, and thence in interference in the function of monitoring—and especially recognising—animals or portions thereof. As pixels are covered up or blurred, the image processing device will become increasingly unreliable.

The camera device becoming less reliable can result in undesirable situations, such as false or missed alarms. To prevent such, the known camera devices have to be cleaned relatively often, which is often undesirable.

An aim of the present invention is therefore to improve said camera device such that it is made more reliable by having to be cleaned less often, in particular by decreasing soiling by flies and the like.

The invention achieves this aim with a camera device according to Claim 1, in particular a camera device for observing and recognising at least a portion of a livestock animal in a shed environment, comprising a housing with an outer surface and with a light transmitting opening, an optics, provided in the housing behind said opening, for forming an image of a portion of the camera's environment, a light-sensitive sensor with a matrix of pixels provided in the housing, which is configured to record said formed image, an image processing device for processing said recorded image and for recognising at least a portion of said shed animal therein, and a control unit for controlling the camera device, wherein a first portion of said outer surface is lighter in colour on a side of the opening at least directly around said opening than a second portion of said outer surface which is located away from said opening and which is at least half the size of the first portion.

The camera device according to the invention experiences significantly fewer fly visits and thus less associated soiling than comparable camera devices which are not lighter in colour directly around said opening. Without deeming himself to be bound to an explanation, the inventor suspects that flies see such a lighter-coloured first portion less as a potential hiding hole or other escape route, and thus as an attractive place to rest and the like, than the more distant darker-coloured second portion. Such a second portion then has, of course, a relevant relative area and is at least half as large as the lighter-coloured first portion. Additionally, an indirect advantage of the decrease in fly frequentation is that there will also be fewer spiders due to the reduced food supply. This leads to fewer spider webs, and a lower risk of such spider webs dangling in front of the lens (opening).

It should be noted that there are also, for example, known camera devices used in milking robots for recognising teats. However, such camera devices are always associated with a cleaning device, so that the aforementioned problem of cleaning by persons almost never arises. The invention therefore relates in particular to camera devices which are without an associated cleaning device. In addition, general surveillance cameras are known, but these almost always transmit only images, without recognising animals or portions of animals therein. In this case, it is much less important that the path for light, such as lens surfaces and the like, remains free of fly droppings and the like. After all, images are reviewed by people, who are much better able to recognise animals in images subject to interference from these droppings. The invention thus relates expressly to camera devices with built-in image recognition, and without an associated cleaning device. Examples include cameras installed in calving pens, or similar facilities for sheep, pigs, etc., cameras that monitor groups of livestock for behaviour, such as heat in cows, cameras that monitor growing animals, such as calves, etc.

It is also important to note that substantially entirely light-coloured camera devices will also be more affected by flies and the like, and are therefore not part of the invention. It is advantageous if the housing—always on the outside of course—has a lighter-coloured first portion and a darker-coloured second portion, because the flies are then led away from the first portion and attracted to the second portion. This in an example of push-pull technology.

Lastly, it should also be noted that the present invention only uses passive, non-moving parts, and does not use active moving parts such as fans. As such, the device according to the invention provides the advantage of less wear occurring, and of the measures also being more reliable than active measures. It remains possible, of course, also to provide the camera device according to the present invention with any additional known measure, such as said fan, which can, for example, generate an airflow across the lens.

Advantageous embodiments are described in the attached dependent claims, and in the following part of the description.

In particular, said first portion is lighter in colour than any other portion of said outer surface. This reinforces the push-pull principle, as flies and the like will then consider this first portion the least attractive portion of the outer surface.

In itself, the feature of being "lighter in colour" is not particularly limited, and various variants are possible. A few different ones will be given below, wherein a camera device complies with the invention if the first and second portions comply with at least one such variant.

Advantageously, said first portion is lighter in colour according to the colour sensitivity of one or more predetermined flying insect species to be avoided. Although the invention still achieves a satisfactory result with a first portion that is lighter in colour according to a human benchmark, the results can be even better if the colouring is adapted for said one or more insect species. After all, their colour sensitivity can differ from that of humans. In particular, fly species (*Musca*) are chosen in this case, which are often found in shed environments. In comparison with humans, their sensitivity is shifted towards the shorter-wavelength portion of the spectrum. In this case, sensitivity to red is (strongly) reduced, while sensitivity to blue-violet and longer-wavelength UV is relatively higher. By taking this into account in the colouring of the first and second portions, and optionally the rest of the outer surface of the housing, a camera device less subject to soiling can effectively be obtained. For example, white, yellowish and light green are suitable colours for the first portion, while black, blue, purple and red are suitable colours for the second portion or other portions of the outer surface. In other words, the aforementioned second portion advantageously has a spectral reflectivity with a maximum situated between UV(A) and a wavelength of 500 nm. Thus, the colour appearance will be in the blue-violet portion of the spectrum.

A suitable colour for the first portion, in particular, can also be indicated in other ways. In embodiments, said first portion of the outer surface either has a colour for which the best rgb equivalent has a blue value that is at most equal to the highest out of the red value and the green value, or has a colour that has a positive b* value in the CIELAB colour space. This means that either the blue value is at most 10% higher than the highest out of the red value and the green value of the rgb colour that best corresponds to the colour of said portion of the housing around the opening, or the b* value in the CIELAB colour space is situated in the yellow portion and not in the blue portion. In principle, this is measured under illumination by the standard illuminant D65, but in practice a comparable result can be obtained with many types of conventional illumination. Advantageously, said portion of the housing around the opening is white or grey, i.e. with red, green and blue values that each differ by at most 5% from their combined average, and which are preferably equal and as high as possible. Additionally, it may be advantageous to give the second portion a colour with a negative b* value in the CIELAB colour space, or an rgb-equivalent colour with a blue value as the highest value. Such light colours for the first portion, and potentially bluer colours for the second portion, exhibit a positive, i.e. reducing, effect on the number of insect/fly visits to the relevant surfaces, such as lenses, cover plates and the bottom plate.

In embodiments, the expression "lighter in colour" is defined as having an L* value in the CIELAB colour space that is higher by at least 20. The L* value is a measure of the "lightness" of a colour, where a value of 0 indicates black and a value of 100 indicates diffuse white. Glossy white can have a higher value still. If the L* value is higher by at least 20, the colour is already lighter enough to bring about an effect of less fly frequentation. Of course, a greater difference will also provide a greater effect.

In embodiments, the expression "lighter in colour" is defined as having a diffuse reflectivity that is at least 10%, advantageously at least 20%, higher than that of the second portion, or any other portion of the outer surface. This was measured with illuminant D65, but a similar difference will be produced with many other, similar light sources. Such a difference in diffuse reflectivity already appears to produce a difference in attractiveness between the first portion and the second or other portion of the outer surface. In terms of absolute value, the diffuse reflectivity is, in particular, at least 40%, more particularly at least 50%.

It will be understood that it is not straightforward to give an unambiguous description of "lighter" in colour, whereas in practice this is relatively straightforward for the average observer. However, the definitions given are a guide, while the equivalents of the definitions given in other colour systems will equally be valid.

In embodiments, a tunnel-shaped guide portion is provided between said opening and said optics, which guide portion is darker in colour on the inside, with either a reflectivity of at most 20%, preferably at most 10%, or an L* value of at most 25 in the CIELAB colour space. In most cases, the optics, i.e. the one or more optical elements for forming the image on the light-sensitive sensor, is situated slightly below the outer surface of the housing, so that the opening is needed to allow light to reach that sensor. In order to prevent dust, light, water and the like from entering the housing through the opening and over the optics, there is often a tunnel-shaped connection between the housing from the edge to the optics. This tunnel-shaped connection is on the inside, i.e. the side visible from the outside of the camera device, and preferably exhibits low reflectivity and is preferably matte and as dark as possible, preferably black, in order to suppress stray light. In this case, the reflectivity, or the L* value, is thus preferably as low as possible. Preferably, the tunnel-shaped portion is as small as possible, in order to prevent flies and the like from still viewing the opening as a refuge or hiding hole. In embodiments, a light transmitting cover plate is provided in the opening, to counter dust and the like on the optics. This plate is preferably flush and smooth with respect to the housing at the opening.

In embodiments, said image processing device comprises an image processor provided in said housing, wherein a distance between said image processor and said opening is at least half of the largest outer dimension of the housing. The image processor is often a component that generates a relatively large amount of heat, and is therefore warmer than most other portions of the camera device. By providing this portion in a portion of the housing situated far away from the opening, in particular in a half that is situated away from the opening, the portion of the housing around the opening will be less warm than the portion of the housing on an opposite side, i.e. where the image processor is located. Heat appears to be another important factor in luring flies and the like away, so this measure helps to further reduce the relative number of visits by the insects to the opening or the optics. It is also possible for the image processing device to be in a separate, second housing, so that any heat generation will not affect the housing with the opening.

In principle, the design of the camera's light-sensitive sensor is not particularly limited and it may, for example, be a conventional rgb sensor. In particular embodiments, the camera device comprises a light source with a power supply and an emitter, in particular a projector, and a distance between said power supply and said opening is at least half of the largest outer dimension of the housing. In contrast to conventional rgb sensors used in normal video cameras, such embodiments are able to emit the required light themselves, so that they are also usable in the dark. Since the light source, and potentially the power supply as well, can and often will become warm, it is again advantageous if these are provided in a half of the housing opposite the opening, or at least at a distance from the opening. Again, warmer portions of the housing attract more flies than cooler portions. In particular, the light source relates to a projector, and the optical sensor comprises a stereo camera, in the form of two (or more) separate rgb sensors. Examples of light sources are LEDs and laser diodes or tubes. The latter are used, for example, to actively cast a pattern onto the environment. The reflection of the pattern can be used to determine a 3D representation of that environment. In this case, the laser diode or tube can itself be considered as the light source, and the mask or similar as the projector. In all cases it will be clear, from theoretical or practical considerations, which component gets the hottest.

In particular, the housing comprises first cooling ribs on the outside which are thermally conductively connected to said light source and/or said image processor. For proper heat management of the light source and/or the image processor, such first cooling ribs are often desirable. Naturally, these will dissipate the heat to the outside and will therefore be warmer than the rest of the housing. Since the light source/image processor are, in particular, already a relatively large distance away from the opening, similar could easily apply to the cooling ribs.

In embodiments, said control unit comprises a sensor control unit for controlling and reading out the sensor, and the housing comprises second cooling ribs which are thermally conductively connected to said sensor control unit and are thermally separated from the first cooling ribs. The sensor control unit is also advantageously cooled through the provision of cooling ribs, as applicable. Even though the first and second cooling ribs have the same function, they are advantageously thermally separated from one another as the second cooling ribs almost always remain cooler than the first, because the power produced by the sensor control unit is almost always considerably lower than that of the light source or the image processor.

The cooling ribs have dimensions appropriate to the amount of heat that they dissipate on average or maximally. However, a distance between ribs for said first and/or second cooling ribs is, in particular, at least 6 mm, preferably between 6 and 10 mm. With such distance between ribs, less dust collects between the ribs, and they will be more attractive for flies to crawl between, and thus not stay on or around the opening.

The invention also relates to a livestock shed for livestock animals, in particular for ruminants, comprising a dwelling space for one or more of said livestock animals and with a camera device according to the invention therein which is configured to observe and recognise at least a portion of at least one of said livestock animals. In such livestock sheds, there are often large numbers of flies and other flying insects present, which can heavily soil the camera device and make the function of recognising animals or portions of animals less reliable, or at least make it necessary to clean the camera device frequently. With the camera device according to the invention, it can reliably observe and recognise animals or portions thereof in such a livestock shed for much longer without cleaning.

In particular, the camera device is, in this case, configured to observe and recognise animals or portions thereof from above. Such camera devices are often installed relatively high above the ground and are not easily accessible to users, so it is important that they do not need to be cleaned often. This is possible with the camera device according to the invention. One example here is a cattle shed with a camera device that monitors a herd in the shed from above, for example in order to recognise relative crowding in certain places, such as at a feeding fence or a water trough. This information can then be used for or by autonomously driving vehicles such as manure scrapers or the like.

Figure 2:
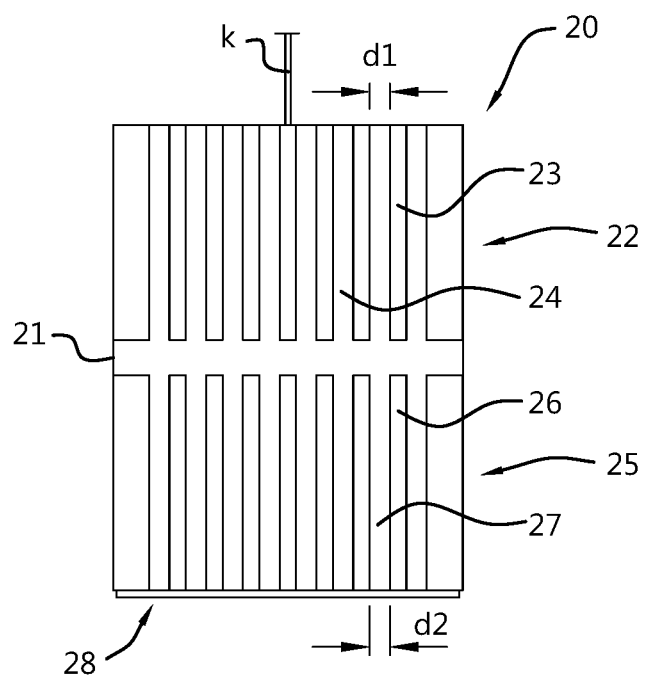
Figure 3:
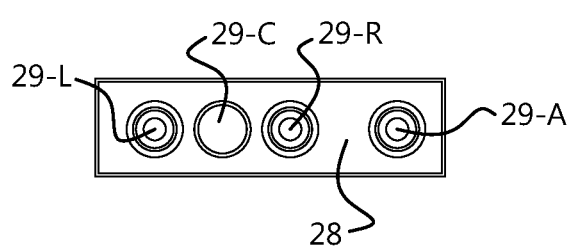
Figure 4:
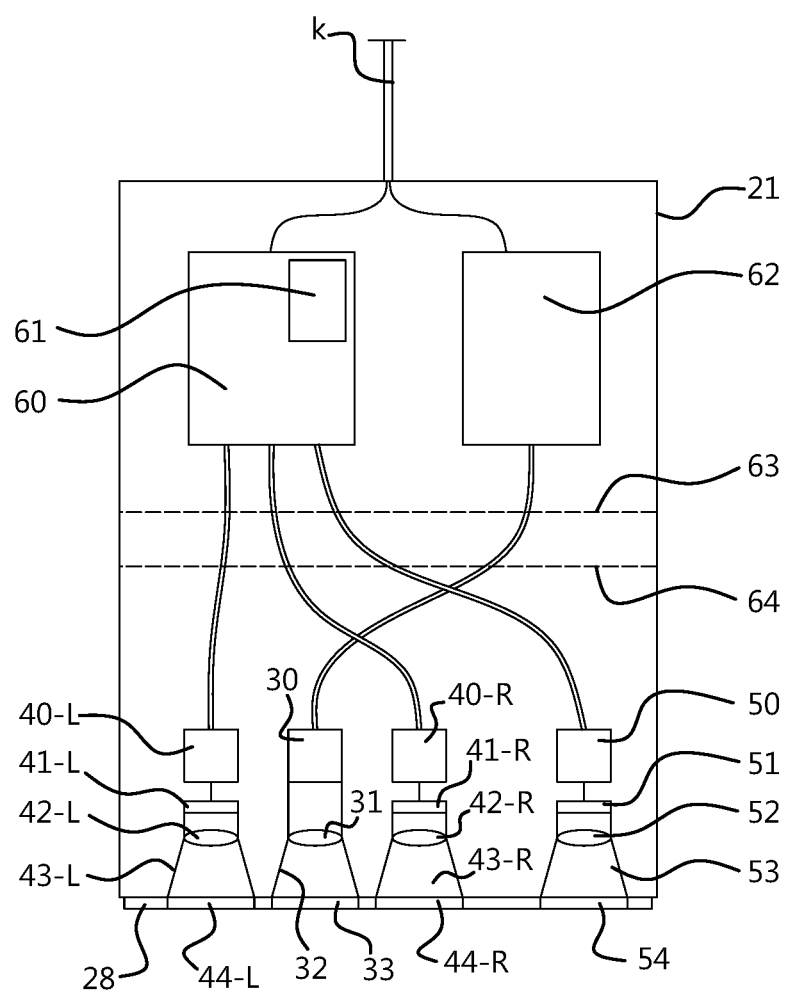

The invention will now be explained in more detail with reference to the drawing, in which:

FIG. 1 schematically shows a shed according to the invention;

FIG. 2 schematically shows a side view of a camera device according to the invention;

FIG. 3 schematically shows a view from below of the camera device of FIG. 2; and FIG. 4 schematically shows a cross section of the camera device of FIG. 2.

FIG. 1 schematically shows a shed 1 according to the invention. The shed 1 has an inner space 2 where livestock animals 3 roam, and a calving pen 4 for calving animals 5. A first camera device 7 according to the invention is suspended from a roof truss 6, with a field of view 8. A second camera device 9 according to the invention is provided in the calving pen, with a field of view 10.

The livestock shed 1 is shown here as a livestock cattle shed for multiple animals, even though only a single livestock animal 3 is shown. The livestock animals 3 are here, for example, cows, or pigs, etc., which are often kept in larger groups. It is also possible to keep animals in small groups or even individually, such as horses, which often represent a high individual value.

The camera device 7 according to the invention is suspended high above the livestock animals 3, such as from a roof truss 7, in order to be able to observe a sufficient number of livestock animals in the field of view 8. The first camera direction 7 serves, for example, to observe the livestock animals 3, to see if concentrations of livestock animals are building up somewhere, if there is panic, such as based on many rapid movements, if a (female) livestock animal 3 is in heat, because it is being mounted and thus hidden by another livestock animal, and so on. The high position of the camera device 7 means that it is often not easy to clean, so it is important that it does not experience too much soiling, in particular from fly droppings, which cannot be shown here on this scale, but which can be present in large numbers in sheds. To that end, the camera device 7 is configured according to the invention as will be explained in more detail below.

A second camera device 9 according to the invention is provided in a separate calving pen 4, with a field of view 10 with which a calving animal 5 can be observed and monitored. Since calving is a risky event, and it is often not possible or desirable for a farmer or veterinarian to be present at all times, it is particularly important that the image from the camera device 9 is as reliable as possible, and is therefore free of flies and their droppings as much as possible. For this reason, the second camera device 9 is also configured according to the invention.

FIG. 2 schematically shows a side view of a camera device 20 according to the invention. The camera device comprises a housing 21 and thereon a first row 22 of first cooling ribs 23 with spacing 24, and a second row 25 of second cooling ribs 26 with spacing 27, 28 denotes a bottom plate and k denotes a cable for power supply and/or data traffic.

FIG. 3 schematically shows a view from below of the camera device 20 of FIG. 2. 29-C denotes an opening for a projector, 29-L and 29-R denote openings for a left-hand and right-hand camera, respectively, and 29-A denotes an opening for an additional rgb camera.

FIG. 4 schematically shows a cross section of the camera device 20 of FIG. 2. Shown in the housing 21 are a light source 30 with a light source optics 31, a projector tunnel 32 and a projector cover plate 33, and a left-hand (-L) and right-hand (-R) sensor control unit 40, an optical sensor 41, a sensor optics 42, a camera tunnel 43 and a camera cover plate 44. 50 denotes an rgb sensor control unit, 51 denotes an rgb sensor, 52 denotes an rgb optics, 53 denotes an rgb camera tunnel and 54 denotes an rgb camera cover plate. In addition, an image processing device 60, a general control unit 61 and a power supply 62 are provided. Lastly, 63 denotes the lower boundary of the first cooling ribs 23, and 64 the upper boundary of the second cooling ribs 26 of FIG. 2.

The camera device 20 shown in FIGS. 2, 3 and 4 comprises a stereo camera with a projector, a left-hand and a right-hand camera, and a separate optical rgb camera, although other camera types are also possible, such as a time-of-flight 3D camera. The stereo camera comprises a projector with a light source 30 and an optics 31, and which is supplied with power by a power supply 62. The light source 30 may comprise, for example, a visible-light or infrared emitter and a projection plate, where the emitter is the actual light-emitting body, and the projection plate is a fixed or non-fixed plate which, together with the light source optics, serves to make the emitted light form a pattern within the field of view of the camera device 20. It is also possible for the light source 30 simply to emit light that is captured by the left-hand and right-hand cameras.

The emitted light will pass through the projector tunnel 32, which is preferably dark and matte, such as matte black, on the inside in order to prevent stray light. The light will leave the housing 21 via the opening 29-C indicated in FIG. 3. In order to protect against the ingress of dirt, water, etc., the opening 29-C is provided with a transparent, such as glass, projector cover plate 33. It should be noted that the respective tunnels 43-L, 43-R, and 53, as well as the respective cover plates 44-L, 44-R, and 54, perform a similar function for the openings 29-L, 29-R, and 29-A, and so they will not be discussed separately.

The stereo camera comprises a left-hand and a right-hand camera, each with an optics 42-L and 42-R, respectively, an optical sensor 41-L and 41-R, respectively, and a sensor control unit 40-L and 40-R, respectively. The optics 42 serves to project an image onto the optical sensor 41, which in each case includes a matrix of pixels, as is known in the prior art. These pixels are then read out by the sensor control unit 40. Both images from the left-hand and right-hand optical sensors 40-L and 40-R are processed by the image processing device 60, which is provided with at least one processor, into a spatial image of the space seen by the camera device. In FIG. 1, for example, the first camera device 7 sees the portion of the inner space 2 within the field of view 8.

In addition to the two cameras of the stereo camera, an ordinary rgb camera can also be provided in the housing 21, which may, for example, provide colour images. These can serve as an aid for the image processing device 60 and for a user.

The bottom plate 28 is at least directly around the openings 29—and preferably entirely—lighter in colour than the other outer surfaces of the housing 21. For example, the bottom plate 28 is white, for example lacquered, sprayed or painted. Other light colours are also possible, such as light yellow, or a metallic colour such as aluminium or chrome. It is also advantageous if the colour hue does not tend towards the bluish. To that end, the colour is approximated as closely as possible in the rgb spectrum, for example spectrophotometrically. If this rgb equivalent has a proportion of blue that is smaller than the proportion of red and/or smaller than the proportion of green, this colour is considered as not tending towards the bluish. However, the lighter the colour tint of the bottom plate 28, i.e. the more the red, green and blue values approach one another and become higher, the less important the colour hue becomes. Dark colours, such as intense colours, with a reflectivity lower than 40%, are not suitable for the bottom plate 28 according to the invention. Incidentally, this colour requirement does not apply to one or more other outer portions of the camera device. For example, it is quite possible to give the cooling ribs 23 or 26 an intense colour such as red or blue, with a reflectivity lower than 40%. Other ways of indicating "lighter" or "darker"/"more intense" are also possible, such as with a higher or lower L* value in the CIELAB colour space, for example between 60 and 100 for "lighter" and at most 40 for "darker". Reference is made to the introduction of the description.

It can be seen that the image processing device 60 and the power supply 62 are located in the (in the figures) uppermost portion of the housing 21, above the lower boundary 63 and in thermal connection with the first cooling ribs 23. Conversely, the sensor control units 40-L, 40-R and 50 are located in the lower portion, below the upper boundary 64 and in thermal connection with the second cooling ribs 26. The image processing device 60 and the power supply are the portions of the camera device 20 that get the hottest, at least hotter than, for example, the sensor control units 40 and 50, so the first cooling ribs 23 will usually be warmer than the second cooling ribs 26. It should be noted here that the first and second cooling ribs are thermally separated. The effect of this measure is that flies and the like will be attracted by the first cooling ribs 23 rather than the second cooling ribs 26 and will therefore be further away from the openings 29. As a result, they will soil the cover plates 33, 44, 54 (or, failing that, the optics behind them) less quickly. To increase the effectiveness of this measure for luring flies away from the openings 29, it is advantageous to make the distance between the heat-producing components and the openings as large as possible. It is therefore advantageous if the distance between at least one of the openings 29 on the one hand and the image processing device 60 and/or the power supply 62 on the other is at least half of the dimension of the housing 21 in the direction parallel to that of the emitted light. In particular, the distance is at least half of the largest outer dimension of the housing 21. In practice, this usually corresponds to the situation where the image processing device 60 and/or the power supply 62 are situated in one half of the housing 20, and the openings are on the outside of the other half, as far away from the components 60 and 62 as possible. The cooling ribs 23 then cool these warmer components 60 and 62 at a distance from the openings 29.

The distance between the cooling ribs is furthermore denoted as d1 for the first cooling ribs 23 and as d2 for the second cooling ribs 26. It is advantageous for these distances d1 and d2 to be substantially the same, and for the positioning of the cooling ribs 23 and 26 to be such that they are substantially in line with one another, so that the air flowing through them is as unhindered as possible. In addition, it is advantageous to have such distances d1, d2 such that not too much dust collects between the cooling ribs, and that flies view the cooling ribs as hiding places. In this way, they are lured further away from the openings 29. Advantageous distances d1, d2 depend somewhat on the size of the most common flies, but in practice distances of at least 6 mm appear to be useful. Distances of between 6 and 10 mm are advantageous in order to also maintain sufficient cooling capacity of the cooling ribs.

Camera devices according to the invention experience a low level of soiling, in particular by flies in a shed environment. For example, a camera device as described here in the figures, with a stereo camera and a white bottom plate 28 and red second cooling ribs 26, was compared with an otherwise identical camera device with an all-black bottom plate. The test was conducted during peak fly season, from 20th July to 20th September. The criterion used was that cleaning was necessary if fewer than 75% of the pixels of the stereo camera gave a valid value for the stereo image (i.e. the pixel was validly recognised in both sub-images). The camera unit with the black bottom plate had to be cleaned twice a week, while the camera unit according to the invention with the white bottom plate 28 had to be cleaned only once every two months. It goes without saying that this is a very welcome reduction in the need for cleaning.

The general control unit 61 is shown as part of, or at least integral with, the image processing device 60. It is possible for both components to form one unit, or at least to be mounted on one PCB, for example. However, it is certainly possible to provide separate modules for both components. The general control unit 60 serves, for example, to control the data traffic for the sensors/cameras, to monitor the temperature of the components, and so on.

The invention claimed is:

1. A camera device for observing and recognising at least a portion of a livestock animal in a shed environment, comprising:
    a housing with an outer surface and with a light transmitting opening,
    an optics, provided in the housing behind said opening, for forming an image of a portion of the camera's environment,
    a light-sensitive sensor with a matrix of pixels provided in the housing, which sensor is configured to record said formed image,
    an image processing device for processing said recorded image and for recognising at least a portion of said shed animal therein,
    and a control unit for controlling the camera device,
    wherein a first portion of said outer surface is lighter in colour on a side of the opening at least directly around said opening than a second portion of said outer surface which is located away from said opening and which is at least half a size of the first portion,
    wherein the first portion is lighter in colour according to a colour sensitivity of one or more predetermined flying insect species to be avoided, and
    wherein the housing comprises first cooling ribs on an outside.

2. The camera device according to claim 1, wherein said first portion is lighter in colour than any other portion of said outer surface.

3. The camera device according to claim 1, wherein the expression "lighter in colour" is defined as having a diffuse reflectivity that is at least 10% higher than that of the second portion, or any other portion.

4. The camera device according to claim 1, wherein the expression "lighter in colour" is defined as having an L* value in a CIELAB colour space that is higher by at least 20.

5. The camera device according to claim 1, wherein said first portion of the outer surface either has a colour for which a best rgb equivalent has a blue value that is at most equal to a highest out of a red value and a green value, or has a colour that has a positive b* value in a CIELAB colour space.

6. The camera device according to claim 1, wherein a tunnel-shaped guide portion is provided between said opening and said optics, which guide portion is darker in colour on an inside, with either a reflectivity of at most 20% or an L* value of at most 25 in a CIELAB colour space.

7. The camera device according to claim 1, wherein said image processing device comprises an image processor provided in said housing, wherein a distance between said image processor and said opening is at least at least half of a largest outer dimension of the housing.

8. The camera device according to claim 1, comprising a light source with a power supply and an emitter and wherein a distance between said power supply and said opening is at least half of a largest outer dimension of the housing.

9. The camera device according to claim 7, wherein the first cooling ribs are thermally conductively connected to said light source and/or said image processor.

10. The camera device according to claim 9, wherein said control unit comprises a sensor control unit for controlling and reading out the sensor, and wherein the housing comprises second cooling ribs which are thermally conductively connected to said sensor control unit and are thermally separated from the first cooling ribs.

11. The camera device according to claim 10, wherein a distance between ribs for said first and/or second cooling ribs is at least 6 mm.

12. A livestock shed for livestock animals, comprising:
    a dwelling space for one or more of said livestock animals; and
    the camera device according to claim 1 therein which is configured to observe and recognise at least a portion of at least one of said livestock animals.

13. The livestock shed for livestock animals according to claim 12, wherein the livestock animals are ruminants.

14. The camera device according to claim 1, wherein the predetermined flying insect species to be avoided is flies (*Musca*).

15. The camera device according to claim 3, wherein the expression "lighter in colour" is defined as having a diffuse reflectivity that is at least 20% higher than that of the second portion, or any other portion.

16. The camera device according to claim 6, wherein the reflectivity is at most 10%.

17. The camera device according to claim 8, wherein the emitter is a projector.

18. The camera device according to claim 11, wherein the distance between ribs for said first and/or second cooling ribs is between 6 and 10 mm.

19. A camera device for observing and recognising at least a portion of a livestock animal in a shed environment, comprising:
    a housing with an outer surface and with a light transmitting opening,
    an optics, provided in the housing behind said opening, for forming an image of a portion of the camera's environment,
    a light-sensitive sensor with a matrix of pixels provided in the housing, which sensor is configured to record said formed image,
    an image processing device for processing said recorded image and for recognising at least a portion of said shed animal therein,
    and a control unit for controlling the camera device,
    wherein a first portion of said outer surface is lighter in colour on a side of the opening at least directly around said opening than a second portion of said outer surface which is located away from said opening and which is at least half a size of the first portion,
    wherein the first portion is lighter in colour according to a colour sensitivity of one or more predetermined flying insect species to be avoided, and
    wherein the camera device is in a livestock shed for livestock animals comprising a dwelling space for one or more of said livestock animals.

20. A camera device for observing and recognising at least a portion of a livestock animal in a shed environment, comprising:
- a housing with an outer surface and with a light transmitting opening,
- an optics, provided in the housing behind said opening, for forming an image of a portion of the camera's environment,
- a light-sensitive sensor with a matrix of pixels provided in the housing, which sensor is configured to record said formed image,
- an image processing device for processing said recorded image and for recognising at least a portion of said shed animal therein,
- and a control unit for controlling the camera device,
- wherein a first portion of said outer surface is lighter in colour on a side of the opening at least directly around said opening than a second portion of said outer surface which is located away from said opening and which is at least half a size of the first portion,
- wherein said first portion is lighter in colour than any other portion of said outer surface,
- wherein the expression "lighter in colour" is defined as having an L* value in a CIELAB colour space that is higher by at least 20, and
- wherein the housing comprises first cooling ribs on an outside.

* * * * *